United States Patent
Feistel (10) Patent No.: US 12,209,670 B2
(45) Date of Patent: Jan. 28, 2025

(54) PISTON RING FOR A PISTON COMPRESSOR

(71) Applicant: BURCKHARDT COMPRESSION AG, Winterthur (CH)

(72) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 18/255,955

(22) PCT Filed: Dec. 3, 2021

(86) PCT No.: PCT/EP2021/084177
§ 371 (c)(1),
(2) Date: Jun. 5, 2023

(87) PCT Pub. No.: WO2022/117821
PCT Pub. Date: Jun. 9, 2022

(65) Prior Publication Data
US 2024/0044407 A1    Feb. 8, 2024

(30) Foreign Application Priority Data
Dec. 4, 2020   (EP) .................................... 20211878

(51) Int. Cl.
*F16J 9/16*    (2006.01)
*F16J 9/24*    (2006.01)

(52) U.S. Cl.
CPC .. *F16J 9/16* (2013.01); *F16J 9/24* (2013.01)

(58) Field of Classification Search
CPC ..................... F16J 9/16; F16J 9/18; F16J 9/24
See application file for complete search history.

(56) References Cited

U.S. PATENT DOCUMENTS

| 1,767,498 A |   | 6/1930 | Bernard |
| 2,006,365 A | * | 7/1935 | Morton ...................... F16J 9/16 277/489 |

(Continued)

FOREIGN PATENT DOCUMENTS

| AT | 506811 A4 | 12/2009 |
| EP | 3555502 A1 | 10/2019 |

(Continued)

OTHER PUBLICATIONS

International Search report for PCT/EP2021/084177, prepared by the European Patent Office, mailing date Mar. 7, 2022, 7 pages, including English Translation.

*Primary Examiner* — Nicholas L Foster
(74) *Attorney, Agent, or Firm* — Brooks Kushman P. C.

(57) ABSTRACT

Piston ring having a first annular body and a second annular body, which annular bodies, are arranged adjacent to and concentric with one another in the axial direction (A), the first annular body having a radially outwardly directed outer side, an upper and a lower flank and a radially inwardly directed inner side, the second annular body being designed as a segmented sealing ring having a plurality of sealing ring segments, which sealing ring segments each have a radially outwardly directed sealing surface, an up-per and a lower sealing ring segment flank and a radially inwardly directed inner side, the sealing ring segments each being guided on the first annular body by means of at least one guide means, which guide means substantially prevent twisting of the sealing ring segments against the first annular body in the circumferential direction (U) and permit displacement of the sealing ring segments transversely to the axial direction (A).

17 Claims, 8 Drawing Sheets

(56) References Cited

U.S. PATENT DOCUMENTS

| | | | | |
|---|---|---|---|---|
| 3,391,943 A * | 7/1968 | Riley | ............... | F16J 9/063 |
| | | | | 277/488 |
| 6,457,722 B1 * | 10/2002 | Feistel | ............... | F16J 15/26 |
| | | | | 277/546 |
| 10,077,842 B2 * | 9/2018 | Feistel | ............... | F16J 15/24 |
| 11,193,587 B2 * | 12/2021 | Feistel | ............... | F16J 15/24 |
| 11,326,694 B2 * | 5/2022 | Steffen | ............... | F16J 9/00 |
| 2008/0309021 A1 * | 12/2008 | Helpap | ............... | F16J 9/16 |
| | | | | 277/493 |
| 2017/0002928 A1 * | 1/2017 | Feistel | ............... | F16J 15/24 |
| 2020/0096106 A1 * | 3/2020 | Feistel | ............... | F16J 9/26 |
| 2021/0180694 A1 * | 6/2021 | Steffen | ............... | F04B 53/143 |
| 2023/0332688 A1 * | 10/2023 | Feistel | ............... | F16J 15/26 |

FOREIGN PATENT DOCUMENTS

| | | | |
|---|---|---|---|
| GB | 327208 A | 4/1930 | |
| GB | 429814 A | 6/1935 | |

\* cited by examiner

PISTON RING FOR A PISTON COMPRESSOR

CROSS-REFERENCE TO RELATED APPLICATION

This application is the U.S. national phase of PCT Application No. PCT/EP2021/084177 filed on Dec. 3, 2021, which claims priority to EP patent application No. 20211878.2 filed on Dec. 4, 2020, the disclosures of which are incorporated in their entirety by reference herein.

The present invention relates to a piston ring for a piston compressor and to a piston compressor having such a piston ring.

In piston compressors, the working medium is compressed by a piston moving back and forth in a cylinder. The sealing elements that seal the annular gap formed between the piston and the inner wall of the cylinder are called piston rings.

The piston ring described in EP 3 555 502 A1 comprises a sealing ring designed as a friction sealing element, which slides along the inner wall of the cylinder and has support rings arranged on both sides in the axial direction, i.e. a base ring and a cover ring. The sealing ring has three cuts running tangentially to the inner side of the sealing ring, which divide the sealing ring into three sealing ring segments. A clamping ring lying along the inside of the sealing ring generates a preload and presses the individual sealing ring segments against the inner wall of the cylinder. Wear caused by material abrasion is compensated for by the individual sealing ring segments being pushed back by the pressure acting on them in the direction of the inner cylinder wall. As a result, the sealing ring exhibits good conformability in the radial direction and thus forms a good seal against the inner wall of the cylinder, preventing or reducing any leakage that may occur. Such piston rings are suitable in combination with piston compressors whose compression chamber has a high pressure load of more than 500 bar and/or a high temperature load.

A disadvantage of such piston rings is that the sealing ring or the sealing ring segments could be damaged when they are pushed back, so that the sealing ring could have a reduced sealing effect under certain circumstances.

Based on the aforementioned prior art, the present invention is based on the object of eliminating such and further disadvantages of the prior art and, in particular, of specifying a piston ring of the type mentioned at the outset, in which the sealing elements are in secure and good sealing contact with the cylinder wall of a piston compressor without risk of damage.

The invention is further based on the object of providing a piston compressor comprising at least one piston ring as described below, which has more advantageous operating characteristics, in particular a longer service life.

The object is solved by a piston ring and a piston compressor having the features of the independent claims. The dependent claims relate to further, advantageous embodiments of the invention.

The object is solved in particular with a piston ring for a piston compressor comprising a first annular body and a second annular body, which are arranged adjacent to and concentric with one another in the axial direction. The first annular body has a radially outwardly facing outer surface, an upper flank, a lower flank, and a radially inwardly facing inner surface. The second annular body is designed as a segmented sealing ring and comprises a plurality of sealing ring segments, each sealing ring segment having a radially outwardly directed sealing face, an upper and a lower sealing ring segment flank and a radially inwardly directed inner face. In the assembled state, the segmented sealing ring thus has a radially outwardly directed sealing ring face, an upper and a lower sealing ring flank, and a radially inwardly directed sealing ring inner face. The sealing ring segments are each guided on the first annular body by means of at least one guide means, the guide means substantially preventing rotation of the sealing ring segments against the first annular body in the circumferential direction and permitting displacement of the sealing ring segments transversely to the axial direction, i.e. outwardly.

The term "axial direction" with respect to the annular bodies means, for the purposes of the present invention, a direction extending along the axis of rotation (perpendicular to the ring diameter) of the respective annular bodies.

For purposes of the present invention, a displacement "transverse to the axial direction" means a displacement of a sealing segment substantially within the annular plane formed by the second annular body and substantially perpendicular to an imaginary plane, which imaginary plane extends perpendicular to the annular plane and through the axis of rotation.

A piston ring designed according to the present invention can preferably be arranged in a piston ring groove of a piston in a reciprocating compressor and, compared to piston rings known from the prior art, has the advantage that the individual sealing ring segments cannot collide in the circumferential direction during operation. The proposed design measure can therefore prevent damage to the sealing ring segments and increase the service life of the piston rings.

In the area of the segmented sealing ring, the piston ring seals against a mating surface, e.g. the inner cylinder wall of a cylinder liner of a piston compressor, to prevent gas from passing out of the compression chamber. The individual sealing ring segments are designed as friction sealing elements which slide along the inner cylinder wall, whereby the piston ring can be operated dry-running or lubricated. The piston ring according to the invention is preferably suitable in combination with piston compressors whose compression chamber has a high pressure load, in particular between 500 bar and 1000 bar.

In the assembled state, the piston ring according to the invention has a radially outwardly directed piston ring outer face, a radially inwardly directed piston ring inner face and two piston ring flanks arranged therebetween and spaced essentially parallel to one another. In the use of the piston ring according to the invention, one piston ring flank faces the compression chamber and the other, opposite piston ring flank faces the crankcase.

In a preferred embodiment, the guide means consist of the contacting flanks of the first annular body and the sealing ring segments being designed to extend in a mutually positive manner.

For example, the guide means are designed as guide ribs that engage in guide grooves. According to the invention, it is conceivable that the guide ribs are arranged on the sealing ring side and the guide grooves on the first annular body. According to the invention, it is also conceivable that the guide ribs are arranged on the first annular body and the guide grooves are arranged on the sealing ring side. In principle, it is also conceivable that both annular bodies have both guide ribs and guide grooves, the guide ribs and guide grooves being formed and arranged on the contacting flanks of the two annular bodies in such a way that the contacting flanks are designed to run in a mutually formfitting manner.

By integrating the guide means into the contacting flanks, the design effort is minimized and the mechanical load capacity of the piston ring is increased.

In a preferred embodiment of the piston ring according to the invention, the depth of the guide grooves is between 0.5 mm and 4 mm, preferably between 1 mm and 2 mm. Alternatively or additionally, the guide grooves have a width between 10 mm and 50 mm, preferably between 20 mm and 40 mm, particularly preferably between 25 mm and 35 mm.

Such a piston ring has the advantage that the sealing ring segments are guided particularly securely on the first annular body.

In a preferred embodiment of the piston ring according to the invention, the first annular body is made in one piece, preferably endless. This reduces leakage and increases the mechanical strength of the piston ring.

In an alternative embodiment of the piston ring according to the invention, the first annular body is formed as a segmented base ring comprising a plurality of base ring segments. This makes it easier to install the first annular body. Particularly preferably, the number of base ring segments corresponds to the number of sealing ring segments of the segmented sealing ring, as this further facilitates assembly of the piston ring.

In a further preferred embodiment of the piston ring according to the invention, the first annular body is formed from three base ring segments and the second annular body is formed from three sealing ring segments. In this case, each of the three base ring segments and the three sealing ring segments extends over an arc of 120°, whereby each of the base ring or sealing ring segments experiences the same mechanical load during the intended use of the piston ring according to the invention.

Preferably, the segmented sealing ring has an axial sealing ring height in the range of 1 mm to 6 mm so that the second annular body is as compact as possible in the axial direction and takes up little space.

In the operational state, a piston ring according to the invention is arranged in a circumferential piston ring groove of a piston. The circumferential piston ring grooves are designed in such a way that, during operation of the piston compressor, fluid can penetrate from the compression chamber into the groove space located behind the sealing ring segments and, with sufficient fluid pressure, press the sealing ring segments outward onto a mating surface, e.g. onto the inner cylinder wall of a cylinder liner of a piston compressor. For this purpose, the axial backlash of the piston rings in the circumferential piston ring grooves must be sufficiently large.

This eliminates the need for a clamping ring, which rests against the radially inward-facing inner surface of the segmented sealing ring and presses the sealing ring segments against a mating surface. The fluid pressure-dependent contact pressure of the sealing ring segments against the cylinder inner wall also means that less material is removed from the radially outward-facing sealing surfaces of the sealing ring segments.

In a further preferred embodiment, the piston ring according to the invention further comprises at least one further sealing element for sealing the ring joints formed in each case by two opposite ends of adjacent sealing ring segments. By providing one or more such sealing elements, the leakage occurring between two adjacent sealing ring segments in use according to the invention can be significantly reduced.

In a preferred embodiment, a piston ring according to the invention comprises exactly one further sealing element, which is designed as a single-cut ring. One of the ring ends of the single-cut ring is designed with a radially outwardly pointing projection located in the ring plane thereof. The projection is engageable with a recess on an inner side of a sealing ring segment. The single-cut ring rests radially on the inside of the sealing ring segments and seals all of the ring joints present between two adjacent sealing ring segments in each case. Due to its one-piece design, such a sealing element is easy to manufacture, quick to assemble and capable of withstanding mechanical loads.

Preferably, the recess with which the projection of the single-cut ring can be engaged is arranged in the region of the guide means arranged on the sealing ring side.

In a preferred embodiment, the piston ring according to the invention can optionally comprise a third annular body in addition to the first and second annular bodies. The third annular body has a radially outwardly directed outer side, an upper and a lower flank, and a radially inwardly directed inner side. In this embodiment, the segmented sealing ring is disposed between the first annular body and the third annular body.

The first annular body and the third annular body are support rings arranged on both sides of the segmented sealing ring in the axial direction.

In the operating state, the third annular body is preferably arranged on the low-pressure side in the axial direction adjacent to the sealing ring and is dimensioned so that it runs without contact but with as little clearance as possible with respect to the mating partner.

Such a piston ring, which is also called a sandwich piston ring, allows the leakage rate to be reduced.

Particularly preferably, the third annular body is of one-piece design, in particular endless. This allows the leakage to be reduced even more significantly.

The sandwich design of the piston ring according to the invention makes it possible to make the second annular body, which is designed as a segmented sealing ring, from a plastic material that would not in itself be suitable for sealing high pressure differentials in a "self-supporting" design, i.e. without support rings.

In a preferred embodiment, the segmented sealing ring is substantially made of polytetrafluoroethylene (PTFE), although high-temperature polymers such as polyetheretherketone (PEEK), polyimide (PI), polyamideimide (PAI), polyphenylene sulfide (PPS) or mixtures thereof are also used for very high pressure differentials. Due to their mechanical properties, such polymers can withstand high differential pressures with essentially no deformation and also exhibit high thermal resistance. Optionally, the segmented sealing ring can be filled with one or more fillers, in particular carbon, graphite, glass fibers, molybdenum disulfide ($MoS_2$) and/or bronze. This makes it possible in particular to improve the dry-running properties of the sealing ring.

In a preferred embodiment, the first annular body and/or the third annular body are substantially made of a high-temperature polymer, in particular polyetheretherketone (PEEK), polyimide (PI), polyamideimide (PAI), polyphenylene sulfide (PPS) or epoxy resin, a fiber composite material, in particular carbon fibers in a matrix of polyetheretherketone (PEEK) or epoxy resin, a metal, in particular a copper alloy, or an engineering ceramic, in particular aluminum oxide, zirconium oxide, silicon carbide or silicon nitride. Such materials have very high mechanical strengths, which can substantially increase the service life of the piston ring. Optionally, the first annular body and/or the third annular body can be filled with one or more fillers, in particular carbon, graphite, glass fibers, molybdenum disulfide ($MoS_2$) and/or bronze. This makes it possible, in particular, to improve their dry-running properties.

In a preferred embodiment of the sandwich piston ring according to the invention, at least one sealing ring segment of the segmented sealing ring is guided on the first annular body and on the third annular body. Preferably, all sealing ring segments of the segmented sealing ring are guided on the first annular body and on the third annular body. This makes it possible, on the one hand, to achieve particularly secure guidance of the sealing ring segments and, on the other hand, to specify the installation direction of the three annular bodies, thus reducing errors when assembling or installing the piston rings according to the invention.

The return flow of the gas temporarily stored in the piston ring grooves during operation of the piston compressor can—in addition to the axial backlash of the piston rings in the circumferential piston ring grooves described above—be considerably improved by so-called pressure equalization or return flow channels, so that the sealing ring segments have virtually no sealing effect in this phase and are therefore not subject to wear.

In a preferred embodiment of the piston ring according to the invention, the first annular body or the third annular body has at least one radially extending return flow channel on its flank facing away from the sealing ring. The return flow channel extends in the radial direction over the entire flank width and faces the compression chamber in the use of the piston ring according to the invention. Preferably, the return flow channel has a triangular chamfer.

Particularly preferably, the return flow channels in the assembled state of the piston ring are each arranged in the area of the segment ends of the segmented sealing ring, whereby the return flow of the fluid temporarily stored in the piston ring grooves can again be significantly improved.

It is advantageous if the first annular body and—if present—the third annular body fit "without clearance" into the bore of the cylinder when warm from operation. To ensure that the first and, if present, also the third annular body do not jam during the running-in process, in a preferred embodiment of the piston ring or sandwich piston ring according to the invention the radially outwardly directed outer side of the first annular body and/or the radially outwardly directed outer side of the third annular body are designed to taper in the axial direction, preferably conically, starting from the segmented sealing ring.

This ensures that the radially outward-facing outer surface of the first and/or third annular body does not have to be removed over its entire axial height during the running-in process, but only that area which would otherwise be understood to extend over the inner wall of the cylinder. Thus, the piston ring or sandwich piston ring according to the invention is arranged without play in the bore of the cylinder when at operating temperature.

In an alternative embodiment of the piston ring according to the invention, the first annular body has a chamfer on its radially outer ring edge facing away from the sealing ring. The chamfer angle here is preferably between 1° and 10°. Additionally or alternatively, the web height of the chamfer is at least 4 mm.

In an alternative embodiment of the piston ring according to the invention, the third annular body has a chamfer on its radially outer ring edge facing the sealing ring. The chamfer angle here is preferably between 1° and 10°. In addition or alternatively, the web height of the chamfer is at least 4 mm.

In a preferred embodiment of the piston ring according to the invention, in the assembled state of the sealing ring, in each case two adjacent sealing ring segments are in contact along a line of intersection which extends in the radial direction from the inside to the sealing surface of the respective sealing ring segments. In other words, in the assembled state of the sealing ring, two adjacent ring segments are in contact with each other along a line of intersection which, with a tangent to the radially inwardly directed sealing ring inner face, forms an angle of intersection corresponding essentially to 90°.

Such sealing ring segments are particularly robust and easy to manufacture.

In an alternative preferred embodiment of the piston ring according to the invention, the ends of the respective sealing ring segments are axially stepped in the circumferential direction. In this embodiment, the stepped ends of adjacent sealing ring segments are arranged to at least partially overlap in the axial direction to form an axial seal.

This design of the sealing ring segments provides improved axial sealing, particularly in the area of the segment ends.

The object is further solved by a piston compressor, in particular a dry-running piston compressor, comprising at least one piston ring as described above.

Various embodiments of the invention are described below with reference to drawings, wherein identical or corresponding elements are basically provided with identical reference signs. Showing.

Figure 1A:
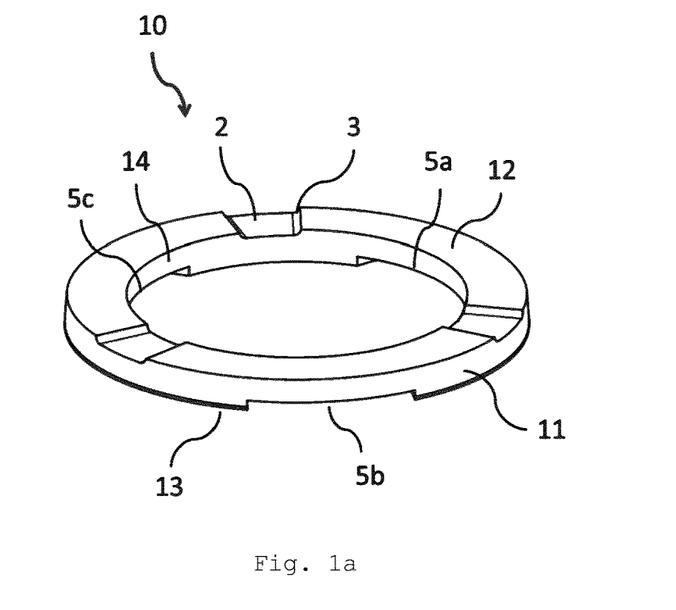
FIG. 1*a* A perspective view of a first annular body.

FIG. 1*a* shows a perspective view of a first annular body 10. The annular body 10 has a radially outwardly directed outer side 11, an upper flank 12, a lower flank 13 and a radially inwardly directed inner side 14. The first annular body 10 is designed as an endless ring and comprises three return flow channels 2 distributed in the circumferential direction and extending in the radial direction along the entire flank width. The return flow channels 2 each have two triangular chamfers 3 at the transition from the return flow channel 2 to the flank 12. On the flank 13 facing away from the backflow channels 2, the annular body 10 further comprises three guide means 5*a-c* distributed in the circumferential direction, which in this embodiment example are designed as groove-shaped recesses, as will be described in more detail below.

Figure 1B:
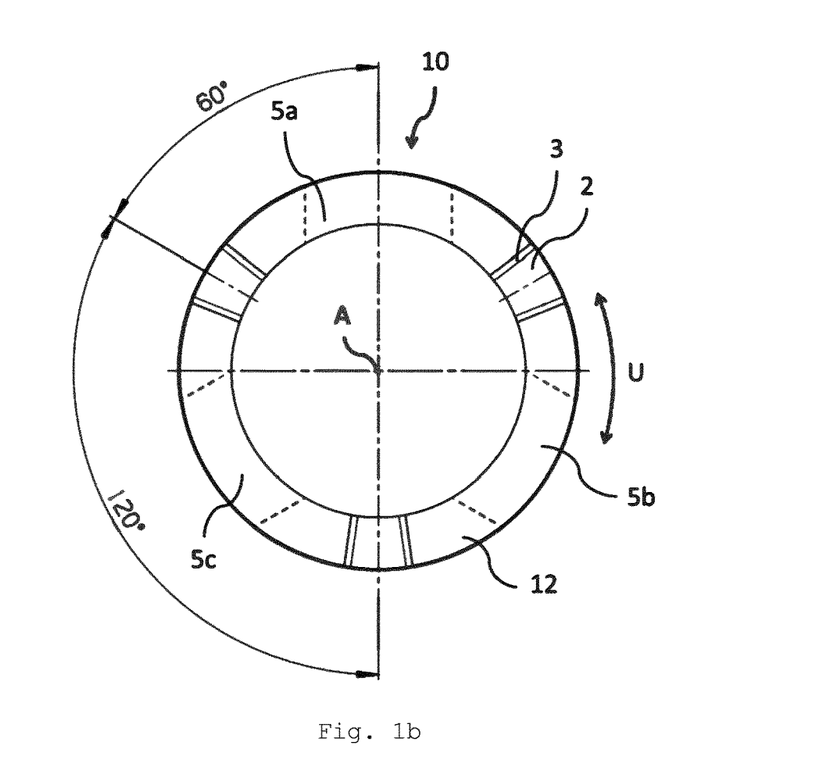
FIG. 1*b* a top view of the first annular body shown in FIG. 1*a*.

FIG. 1b shows a top view of the first annular body from FIG. 1a. Shown are the three radially extending return flow channels 2 with chamfers 3, which are arranged on the upper flank 12 and are offset by 120° relative to the ring axis A in the circumferential direction U. The centers of the guide means 5a-c and the return flow channels 2 are offset by 60° relative to each other in the circumferential direction U. The centers of the guide means 5a-c and the return flow channels 2 are arranged offset by 60° to each other in the circumferential direction U.

Figure 1C:
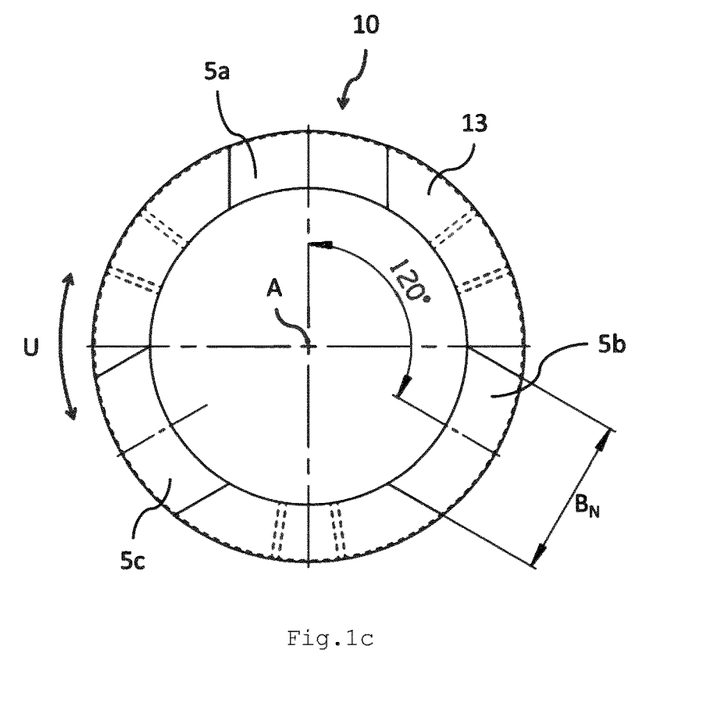
FIG. 1*c* a bottom view of the first annular body shown in FIG. 1*a*.

FIG. 1c shows a bottom view of the first annular body from FIGS. 1a and 1b. Shown are the three groove-shaped recesses 5a-c running transversely to the axial direction A on the lower flank 13 of the first annular body 10, which are arranged offset from each other by 120° in the circumferential direction U. In this embodiment, the groove-shaped recesses 5a-c each have a groove width $B_N$ of 27.5 mm and a groove depth $T_N$ of 1.6 mm.

Figure 2A:
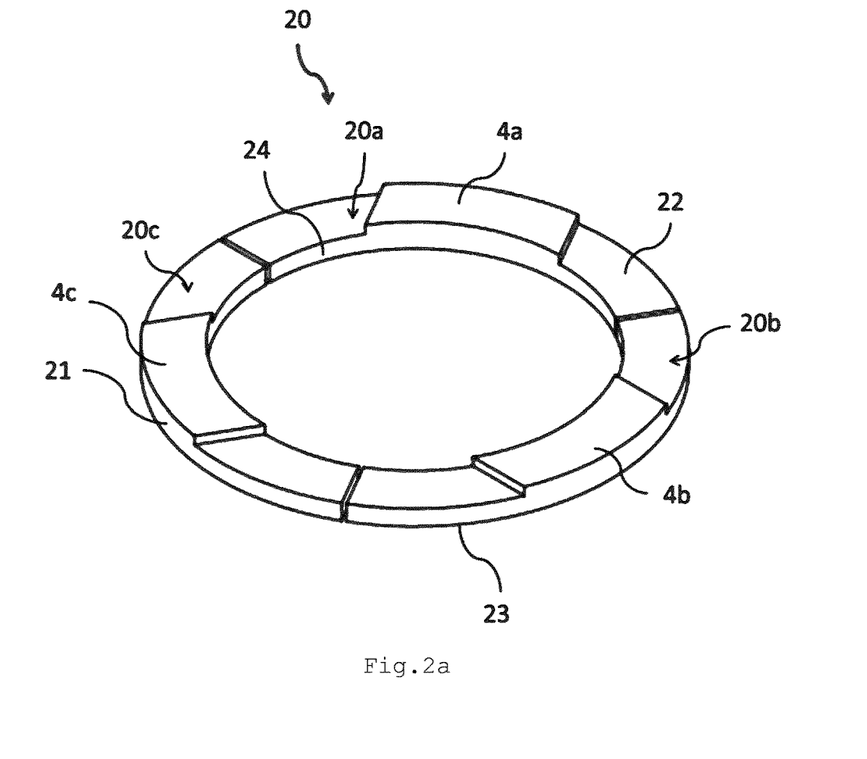
FIG. 2*a* a perspective view of a second annular body, which is designed as a segmented sealing ring.

FIG. 2a shows a perspective view of a second annular body 20, which is a segmented sealing ring 20 comprising three sealing ring segments 20a-c. In the assembled state, the segmented sealing ring 20 has a radially outwardly directed sealing ring surface 21, an upper 22 and a lower sealing ring flank 23 and a radially inwardly directed sealing ring inner side 24, which are respectively formed by the radially outwardly directed sealing surfaces 21a-c, the upper 22a-c and lower sealing ring segment flanks 23a-c and the radially inwardly directed inner sides 24a-c of the respective sealing ring segments 20a-c (reference signs not shown in FIG. 2a for reasons of clarity). The three sealing ring segments 20a-c each have a guide means 4a-c designed as a guide rib.

Figure 2B:
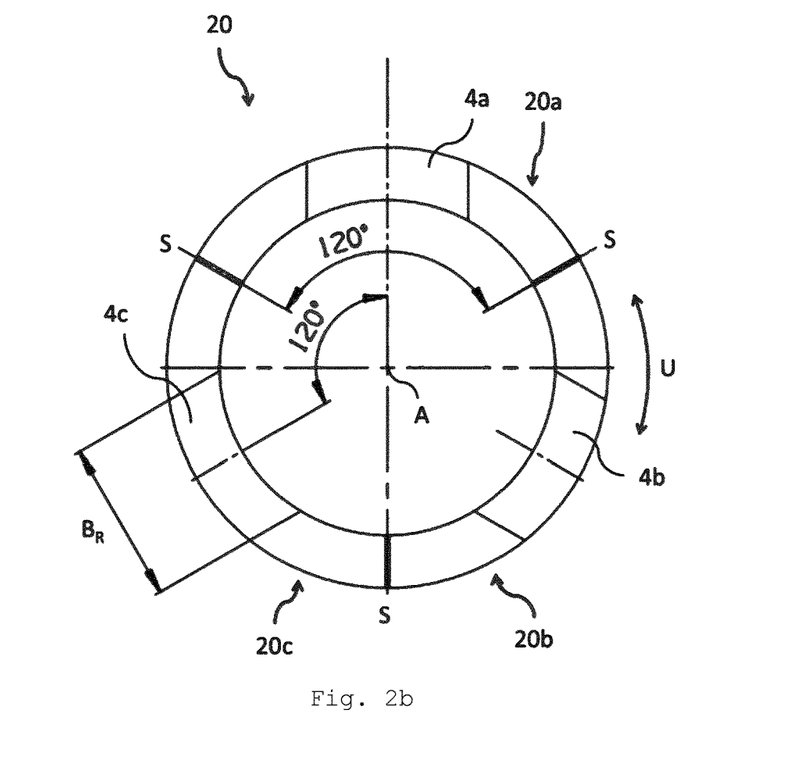
FIG. 2*b* a top view of the segmented sealing ring shown in FIG. 2*a*.

FIG. 2b shows a top view of the segmented sealing ring 20 shown in FIG. 2a. The sealing ring 20 has three radial sections S, each of which extends in a radial direction from the inside to the sealing surface of the segmented sealing ring 20. Each of the three sealing ring segments 20a-c extends over an arc of 120° and comprises a guide rib 4a-c, the guide ribs being arranged offset from one another by 120° in the circumferential direction U. The width of the guide ribs $B_R$ is selected such that the guide ribs 4a-c can be engaged in the guide grooves 5a-c of the first annular body 10 shown in FIGS. 1a-c essentially "without play". Thus, mutual twisting or displacement of the sealing ring segments 20a-c on the first annular body 10 in the circumferential direction U is prevented. In the illustrated embodiment example, the width of the guide ribs $B_R$ is about 27.5 mm and the depth of the guide ribs $T_R$ is about 1.5 mm.

Figure 3:
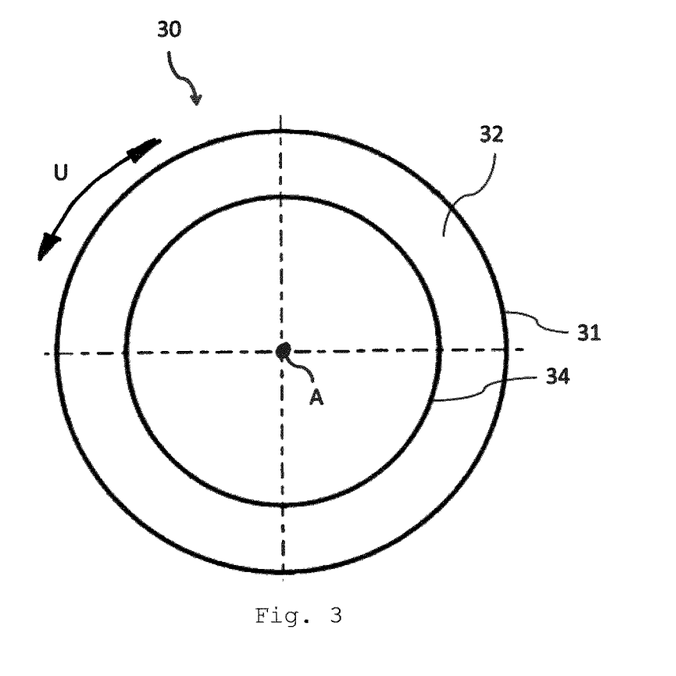
FIG. 3 a top view of a third annular body.

FIG. 3 shows a top view of a third annular body 30, which has a radially outwardly directed outer side 31, an upper flank 32 and a lower flank (not shown) and a radially inwardly directed inner side 34. The annular body 30 is formed as an endless ring. The first annular body 10, the segmented sealing ring 20 and the third annular body 30 are arranged in succession in an axial direction A extending perpendicularly to the circumferential direction U, the segmented sealing ring 20 being arranged between the first and third annular bodies (not shown).

Figure 4:
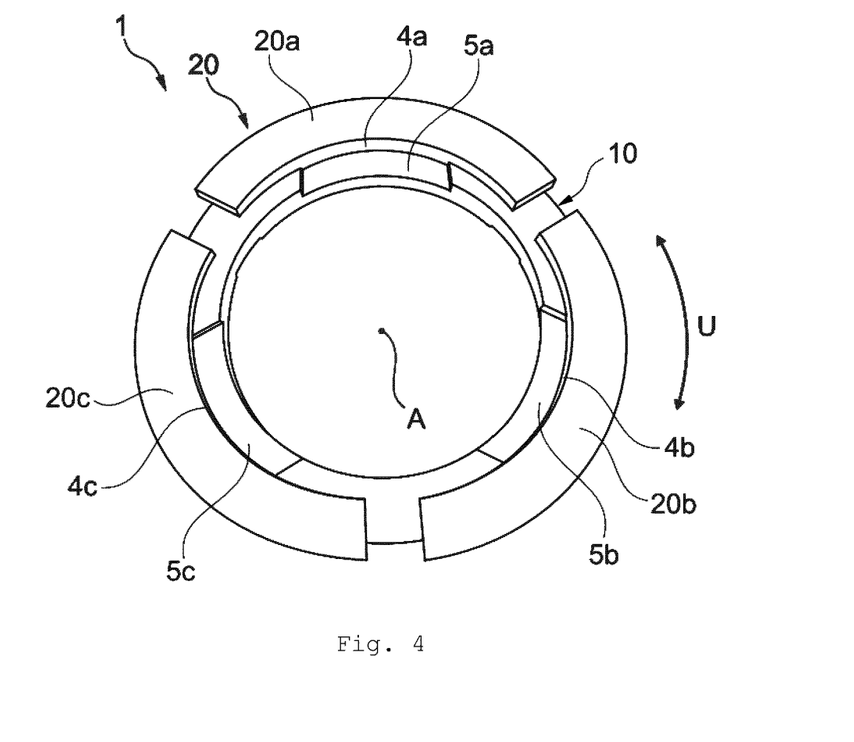
FIG. 4 a piston ring comprising the first annular body shown in FIG. 1*a* and the second annular body shown in FIG. 2*a*.

FIG. 4 shows a piston ring 1 comprising the first annular body 10 shown in FIG. 1a and the second annular body 20 shown in FIG. 2a, wherein the sealing ring segments 20a-c are guided on the first annular body 10 by means of guide means 4a-c, 5a-c. In the embodiment example shown, the guide means 4a-c, 5a-c are formed by the mutually inter-locking configuration of the contacting flanks of the first annular body 10 and the sealing ring segments 20a-c. In this case, the guide ribs 4a-c arranged on the side of the sealing ring 20 engage in the guide grooves 5a-c arranged on the side of the cover ring 10 in such a way that twisting of the sealing ring segments 20a-c against the first annular body 10 in the circumferential direction U is essentially prevented and the sealing ring segments 20a-c can be displaced transversely to the axial direction A.

Figure 5:
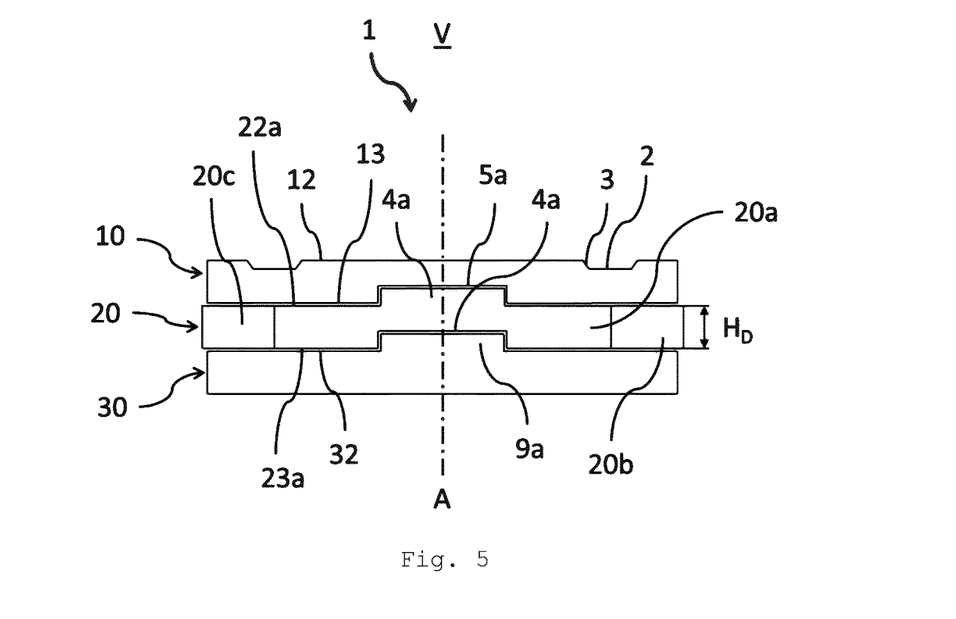
FIG. 5 a piston ring comprising three annular bodies.

FIG. 5 shows a longitudinal section through a piston ring 1 comprising a first annular body 10, a second annular body 20 and a third annular body 30. The second annular body 20 is designed as a segmented sealing ring with three sealing ring segments 20a-c, the segmented sealing ring 20 being arranged between the first annular body 10 and the third annular body 30. On its flank 12 facing the compression chamber V, the first annular body 10 has a plurality of return flow channels 2 which, in the assembled state of the piston ring 1, are each arranged offset in the axial direction A in the region of the segment ends of the segmented sealing ring 20. In the embodiment example shown in FIG. 5, the flanks of the annular bodies 10, 20, 30 that are in contact with each other are designed to run in a mutually positive manner, so that all sealing ring segments 20a-c are guided by means of guide means 4a-c, 5a-c, 9a-c on the first annular body 10 and on the third annular body 30 (shown only for sealing ring segment 20a). In this context, the sealing ring segment 20a has, on its flank 22a facing the first annular body 10, a guide means 4a designed as a guide rib, which engages in a guide means 5a designed as a guide groove, which is formed on the flank 13 of the first annular body 10 facing the segmented sealing ring 20. The sealing ring segment 20a further comprises, on its flank 23a facing the third annular body 30, a second guide means 4a formed as a guide groove and engaging with a guide means 9a arranged on the flank 32 of the third annular body 30 facing the segmented sealing ring 20. The guide means 5a, 4a, 4a, 9a are formed on the respective flanks 13, 22a, 23a, 32 in such a way that the installation direction of the annular bodies 10, 20, comprising them is predetermined in the axial direction. In this embodiment, the axial sealing ring height $H_D$ is 4.5 mm.

Figure 6:
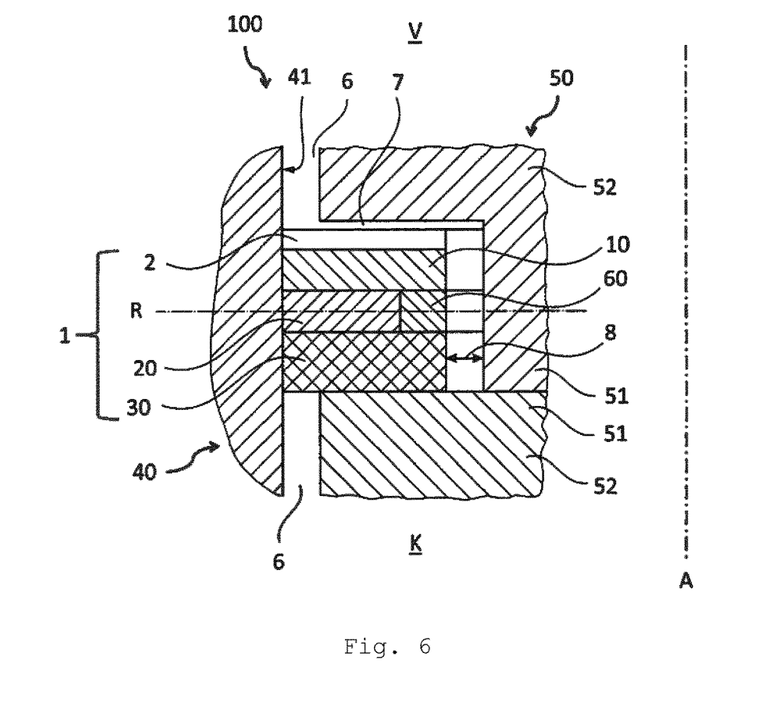
FIG. 6 a longitudinal section through a sealing arrangement arranged on a piston.

FIG. 6 shows a longitudinal section through a piston compressor 100 comprising a cylinder 40 with an inner cylinder wall 41, a piston 50 and at least one piston ring 1 according to the invention arranged in the piston 50 in the retracted state. The piston 50 is designed as a multipiece piston and comprises a plurality of piston bodies 51 arranged one after the other in axial direction A. Each piston body 51 has a chamber disc 52 which forms a circumferential piston ring groove 7 for receiving a piston ring 1. In FIG. 6, the compression chamber V of the reciprocating compressor 100 is arranged at the top and the low-pressure-side crankcase K is arranged at the bottom. The piston ring 1 comprises a sealing ring 20, an optional clamping ring 60, a first annular body 10 and a third annular body 30. The clamping ring 60 preferably exerts a preload acting outwardly in the radial direction R on the sealing ring 20, so that its straightening ring segments 20a, 20b, 20c bear against the cylinder inner wall 41 with the outwardly directed sealing surfaces 21, in particular even in a pressureless state. In the present embodiment example, the first annular body 10 is designed as a cover ring and the third annular body 30 as a support or base ring. The piston ring 1 is spaced apart in the radial direction R to form an inner gap 8 with respect to the chamber disc 52. The inner gap 8 is connected in a fluid-conducting manner via a return flow channel 2 formed on the flank of the cover ring 10 facing the compression chamber and the outer gap 6 on the compression chamber side to a space which is further up and not visible in the view shown.

Figure 7:
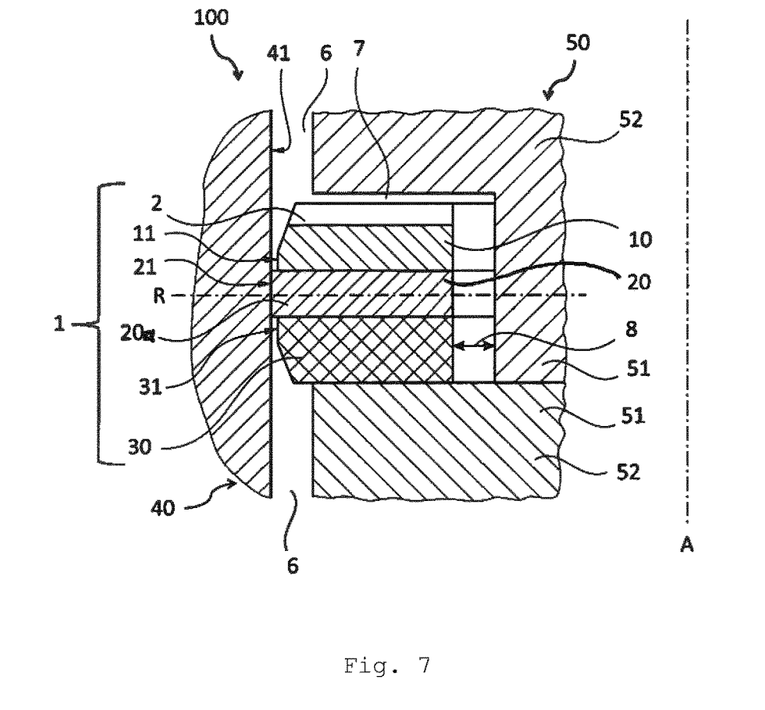
FIG. 7 a longitudinal section through a second embodiment of a sealing arrangement.

FIG. 7 shows a longitudinal section through the piston compressor 100 of FIG. 6, however, with a second embodiment of a piston ring 1 according to the invention in the new state, i.e. before the sealing ring 20 is subject to wear. In an advantageous embodiment, the sealing ring 20 or its illustrated sealing ring segment 20a is designed in such a way that its radially outwardly directed sealing surface 21 in the new state projects in the radial direction R beyond the outer side 11 of the cover ring 10 and beyond the outer side 31 of the base ring 30. As a result, the sealing ring 20 is in contact with the cylinder inner wall 41 during the run-in phase, so that the gap between the outer sealing surface 21 and the cylinder inner wall 41 is extremely small, and the sealing ring segments 20a-c are pressed outward in the radial direction R by the pressure applied in the inner gap 8, thereby removing material from the sealing ring 20 at the outer sealing surface 21 until the sealing ring 20 has adapted to the shape of the bore of the cylinder 40 when it is at operating temperature. In subsequent operation of the reciprocating compressor 100, the outside sealing surfaces 21 of the sealing ring segments 20a-c are subject to wear, whereby the wearing sealing ring segments 20a-c, due to the pressure applied in the inner gap 8, are pressed outward in the radial direction R and, with corresponding wear of the sealing surfaces 21, are pushed outward in the radial direction R, so that the sealing effect between the outside sealing surface 21 and the inner cylinder wall 41 is maintained despite the wear that occurs. In the embodiment example shown in FIG. 7, the cover ring 10 and the support ring 30 are each designed in such a way that their radially outwardly directed outer faces 11 and 31 respectively taper at least partially conically in the axial direction A, starting from the sealing ring 20, so that the radially outwardly directed outer faces 11 and 31 of the cover ring 10 and the support ring 30 do not abut the cylinder inner wall 40 over their entire axial height in the retracted and operationally warm state. In contrast to the piston ring shown in FIG. 6, the piston ring 1 shown in FIG. 7 also does not have a clamping ring on the radially inwardly directed inner side of the sealing ring 20 for pressing the sealing ring segment shown against the cylinder inner wall 41.

Figure 8:
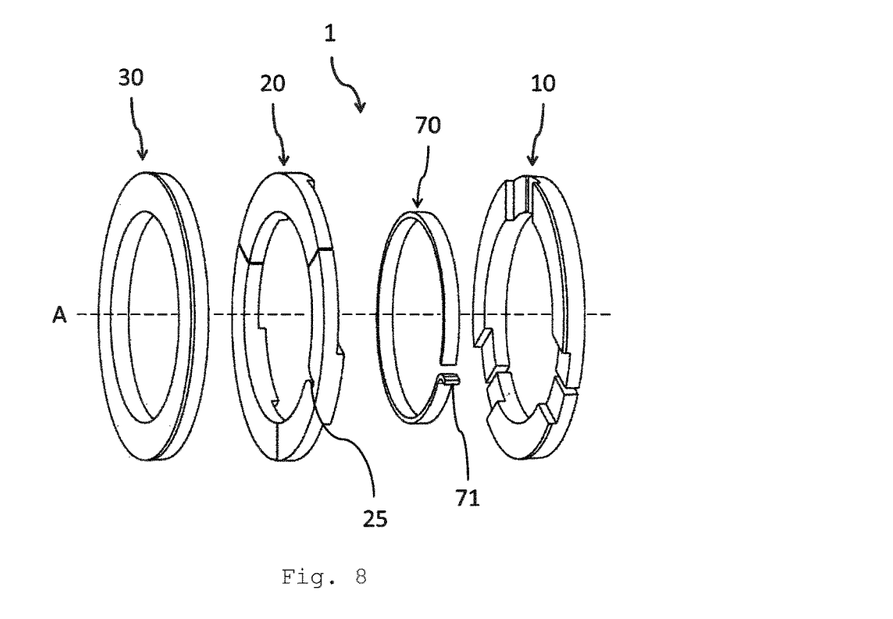
FIG. 8 an exploded view of a piston ring comprising a segmented first annular body and a butt cap.

FIG. 8 shows a further embodiment of a piston ring 1 in which a segmented first annular body 10, a single-cut ring 70 with a fastening element 71, a segmented second annular body 20, and a third annular body 30 are arranged adjacent in the axial direction A. The fastening element 71 is in the form of a radially outwardly facing projection on one end of the single cut ring 70, which is engageable with a recess 25 on the inner side of the second annular body 20.

Figure 9A:
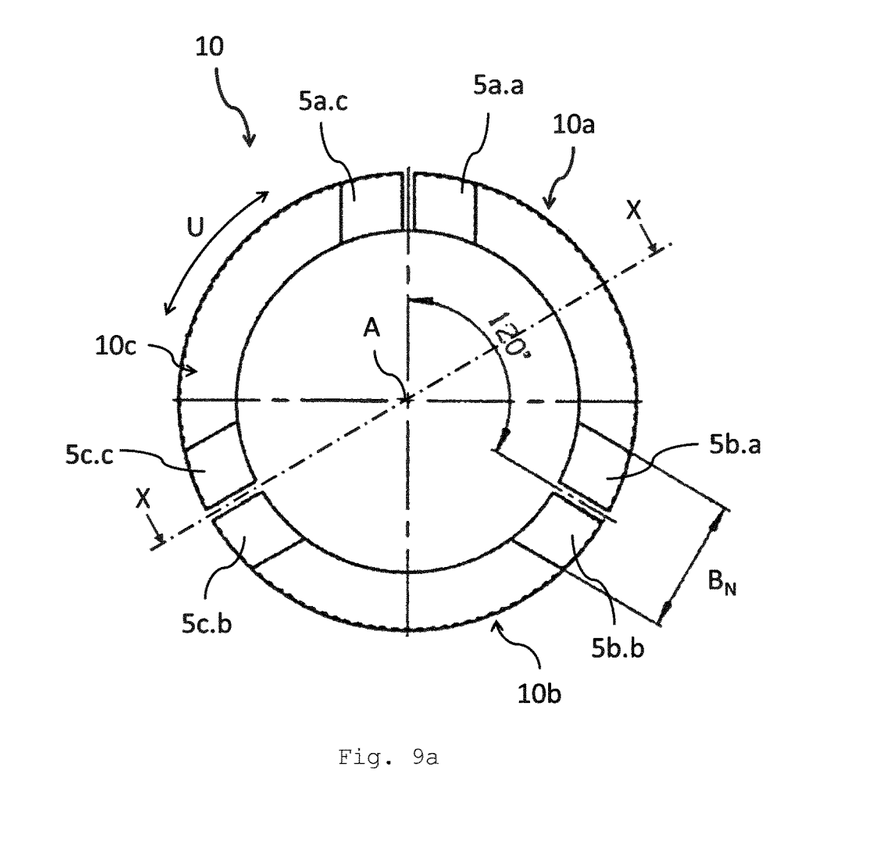
FIG. 9*a* a bottom view of the first annular body of FIG. 8.

FIG. 9a shows a bottom view of the first annular body 10 from FIG. 8. The first annular body 10 is designed as a segmented base ring consisting of three base ring segments 10a-c, each of which extends over an arc of 120°. In the embodiment shown, the guide means 5a-c arranged on the base ring side are designed as guide grooves with a groove width $B_N$ of 11 mm in each case, the guide grooves being formed in each case by two opposing, axially stepped butt ends of adjacent base ring segments. In other words, the end of the base ring segment 10a designated with the reference sign 5a.a together with the end of the base ring segment 10c designated with the reference sign 5a.c form the guide groove 5a. Accordingly, the ends of the base ring segments 10c and 10b designated by the reference signs 5c.c and 5c.b, respectively, form the guide groove 5c, and the ends of the base ring segments 10b and 10a designated by the reference signs 5b.b and 5b.a, respectively, form the guide groove 5b.

Figure 9B:
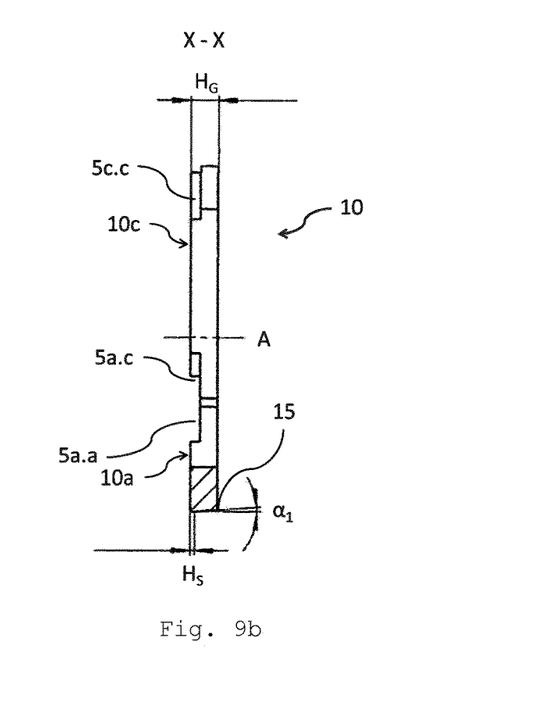
FIG. 9*b* a cross-section of the first annular body along line X-X in FIG. 9*a*.

FIG. 9b shows a cross-section through the base ring 10 shown in FIG. 9a along the line X-X in FIG. 9a. Shown are a complete base ring segment 10c with the ring segment ends 5c.c and 5a.c, which are stepped in the axial direction A, and a cut-off base ring segment 10a with the axially stepped ring segment end 5a.a. In this embodiment, the base ring 10 has an axial height $H_G$ of 3 mm. Furthermore, the base ring 10 has a chamfer on its radially outer ring edge 15 facing away from the sealing ring (not shown). The chamfer angle $\alpha_1$ in this embodiment is 4° and the web height $H_S$ is 0.5 mm.

Figure 10:
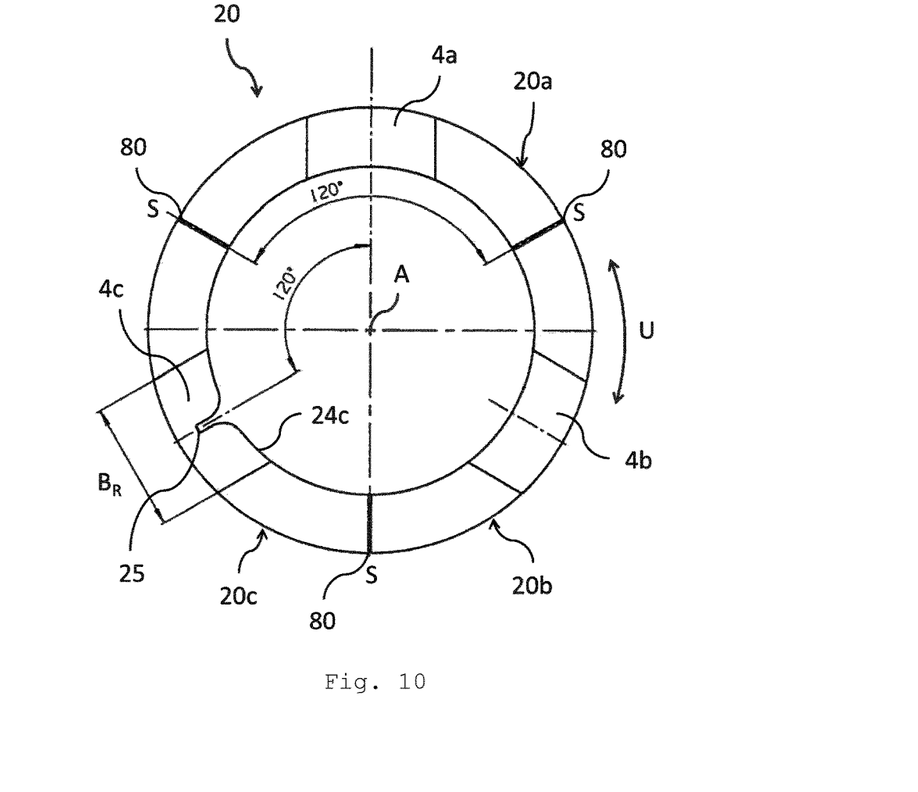
FIG. 10 a top view of the second annular body of FIG. 8.

FIG. 10 shows a top view of the second annular body 20 shown in FIG. 8 with three sealing ring segments 20a-c, each of which extends in the circumferential direction U over an arc of 120° and, in the assembled state of the sealing ring 20, touches along a line of intersection S extending in the radial direction from the inside to the sealing surface of the respective sealing ring segments. Two opposite ends of adjacent sealing ring segments 20a-c each form a ring end gap 80. Also shown are the three guide ribs 4a-c, which extend transversely to the axial direction A and are offset by 120° relative to one another in the circumferential direction U. In this embodiment, the guide ribs 4a-c each have a width $B_R$ of 11 mm. The width of the guide ribs $B_R$ is consequently selected in such a way that the guide ribs 4a-c can be brought into engagement in the guide grooves 5a-c of the first annular body 10 shown in FIG. 8 essentially "without play". In the embodiment shown, one of the sealing ring segments, sealing ring segment 20c, comprises a recess 25 on its inner side 24c in the region of guide rib 4c for receiving the fastening element 71 shown in FIG. 8. The recess 25 is designed in the form of a groove extending in axial direction A over the entire height of the sealing ring.

Figure 11A:
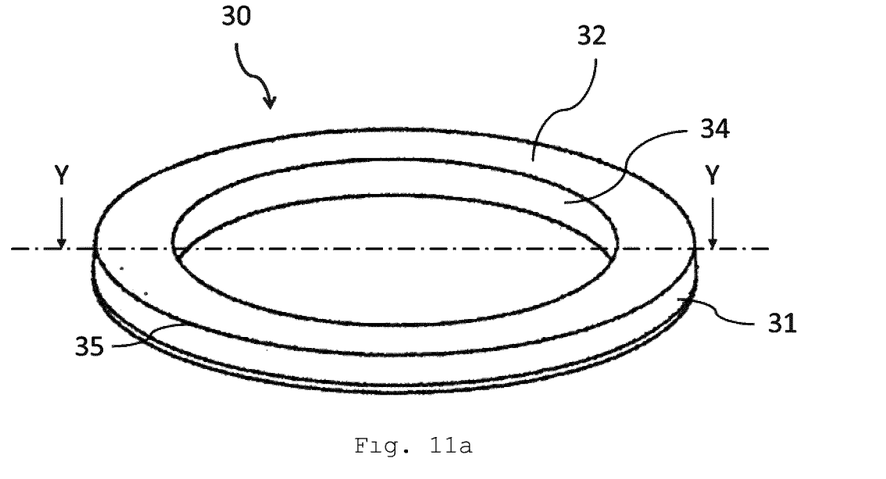
FIG. 11*a* a top view of third annular body of FIG. 8.

FIG. 11a shows a top view of the third annular body 30 shown in FIG. 8, which is of endless design and has a radially outwardly directed outer side 31, an upper flank 32, a lower flank (33 in FIG. 11b) and a radially inwardly directed inner side 34. The third annular body 30 also has a chamfer on its radially outer annular edge 35 facing the sealing ring (not shown).

Figure 11B:
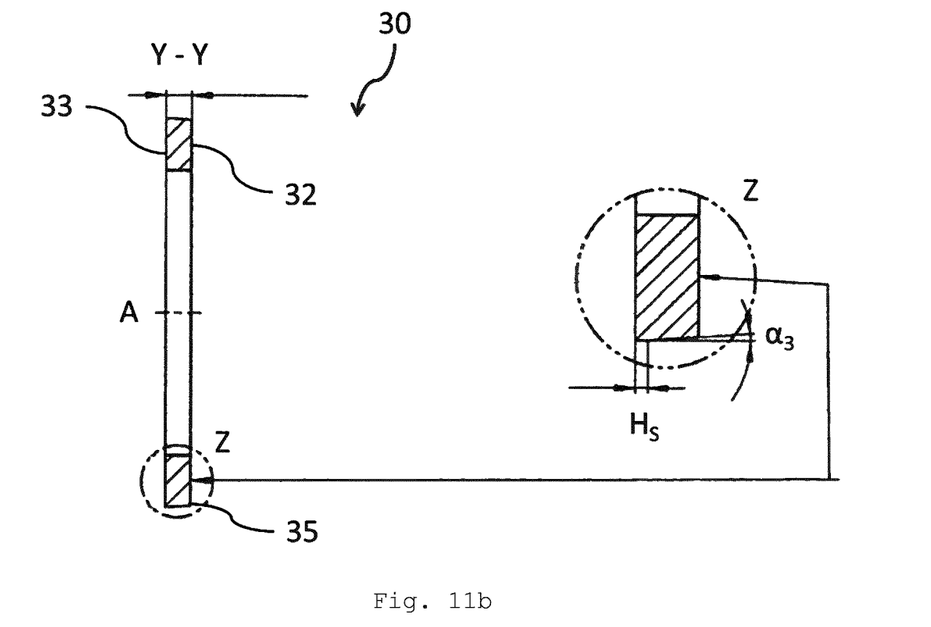
FIG. 11*b* a cross-section of the third annular body along the Y-Y line in FIG. 11*a*.

FIG. 11b shows a cross-section of the third annular body 30 shown in FIG. 11a along the line Y-Y in FIG. 11a. Shown are the upper flank 32 and the lower flank 33 as well as the radially outer ring edge 35 with chamfer on the flank 32 facing the sealing ring (not shown). As shown in the enlarged figure section Z, the chamfer angle $\alpha_3$ in this embodiment example is 4° and the web height $H_S$ is 0.5 mm.

REFERENCE SIGNS

1 Piston ring
2 Return flow channel
3 Triangular chamfer
4 Guide means on the second annular body
5 Guide means on the first annular body
6 External gap
7 Round piston ring groove
8 Inner gap
9 Guide means on the third annular body
10 First annular body
11 Outside of the first annular body
12 Upper flank of the first annular body
13 Lower flank of the first annular body
14 Inside of the first annular body
15 Radial outer ring edge of the first annular body 20 Second annular body
21 Sealing surface of the second annular body
22 Upper flank of the second annular body
23 Lower flank of the second annular body
24 Inside of the second annular body
25 Receptacle for fastening element
30 Third annular body
31 Exterior side of the third annular body
32 Upper flank of the third annular body
33 Lower flank of the third annular body
34 Inside of the third annular body
35 Radial outer ring edge of the third annular body
40 Cylinder
41 Inner wall of cylinder
50 Piston
51 Piston body
52 Chamber disc
60 Clamping ring
70 Further sealing element
71 Fastening element
80 Ring end gap
100 Piston compressor
$\alpha_1$ Chamfer angle on the first annular body
$\alpha_3$ Chamfer angle on the third annular body
A Axial direction
R Radial direction
U Circumferential direction
S Section line
$B_N$ Width of guide groove
$H_A$ Sealing ring height
$H_D$ Sealing ring height
$H_G$ Base ring height
$H_S$ Web height
$T_N$ Depth of guide groove
$B_R$ Width of the guide rib
$T_R$ Depth of the guide rib

The invention claimed is:

1. A piston ring comprising a first annular body and a second annular body, which annular bodies are arranged adjacent and concentric to each other in an axial direction (A),
   wherein the first annular body has a radially outwardly directed outer side, an upper and a lower flank, and a radially inwardly directed inner side,
   wherein the second annular body is formed as a segmented sealing ring comprising a plurality of sealing ring segments, which sealing ring segments each have a radially outwardly directed sealing surface, an upper and a lower sealing ring segment flank as well as a radially inwardly directed inner side,
   wherein the sealing ring segments are each guided on the first annular body by means of at least one guide means formed as guide ribs which engage in guide grooves, which guide means substantially prevent twisting of the sealing ring segments against the first annular body in a circumferential direction (U) and permit displacement of the sealing ring segments transversely to the axial direction (A), wherein the first annular body is formed in one piece.

2. The piston ring according to claim 1, wherein the guide means comprise contacting flanks of the first annular body and the sealing ring segments which extend in a mutually positive manner.

3. The piston ring according to claim 1, wherein the guide grooves have at least one of a depth ($T_N$) between 0.5 mm and 4 mm and a width ($B_N$) between 10 mm and 50 mm.

4. The piston ring according to claim 1, wherein the second annular body is formed of three of the sealing ring segments, and wherein the sealing ring segments each extend over an arc of 120°.

5. The piston ring according to claim 1, wherein the segmented sealing ring has an axial sealing ring height ($H_D$) between 1 mm and 6 mm.

6. The piston ring according to claim 1, wherein no clamping ring for pressing the sealing ring segments against a mating surface is located on the radially inwardly directed inner side of the segmented sealing ring.

7. The piston ring according to claim 1, further comprising at least one further sealing element for sealing the ring end gaps respectively formed by two opposite ends of adjacent ones of the sealing ring segments.

8. The piston ring according to claim 7, comprising precisely one further sealing element, which is formed as a single-cut ring, wherein one ring end of the single-cut ring is L-shaped with a radially outwardly facing projection lying in a ring plane of the single-cut ring, said projection being engageable with a recess on the inner side of one of the sealing ring segments.

9. The piston ring according to claim 1, comprising a third annular body with a radially outwardly directed outer side, an upper and a lower flank and a radially inwardly directed inner side, wherein the segmented sealing ring is arranged between the first annular body and the third annular body.

10. The piston ring according to claim 9, wherein at least one of the sealing ring segments is guided on the first annular body and on the third annular body.

11. The piston ring according to claim 9, wherein the first annular body or the third annular body has at least one radially extending return flow channel on its flank facing away from the segmented sealing ring, said return flow channel extending in a radial direction over the entire flank width and capable of facing a compression chamber (V).

12. The piston ring according to claim 9, wherein, starting from the segmented sealing ring, at least one of the radially outwardly directed outer side of the first annular body and the radially outwardly directed outer side of the third annular body tapers in the axial direction (A).

13. The piston ring according to claim 6, wherein the first annular body has a chamfer at a radially outer ring edge thereof facing away from the segmented sealing ring.

14. The piston ring according to claim 9, wherein the third annular body has a chamfer at a radially outer ring edge thereof facing the segmented sealing ring.

15. The piston ring according to claim 1, wherein, in an assembled state of the segmented sealing ring, two adjacent ones of the sealing ring segments are in contact in each case along a line of intersection(S) which extends in a radial direction from the inner side towards the sealing surface of the respective sealing ring segments.

16. The piston ring according to claim 1, wherein ends of the respective sealing ring segments are axially stepped in the circumferential direction (U) and the stepped ends of adjacent ones of the sealing ring segments are arranged to at least partially overlap in the axial direction (A) to form an axial seal.

17. A piston compressor comprising at least one piston ring according to claim 1.

* * * * *